United States Patent [19]

Tsuruha

[11] 4,274,800
[45] Jun. 23, 1981

[54] GENERAL PURPOSE ASSEMBLY MACHINE

[75] Inventor: Masayuki Tsuruha, Yawata, Japan

[73] Assignee: Matsushita Electric Industrial Co., Ltd., Kadoma City, Japan

[21] Appl. No.: 972,060

[22] Filed: Dec. 21, 1978

[30] Foreign Application Priority Data

Dec. 28, 1977 [JP] Japan .................................. 52/159030
Dec. 28, 1977 [JP] Japan .................................. 52/159031

[51] Int. Cl.³ ........................................... B65G 47/90
[52] U.S. Cl. ..................... 414/750; 414/589; 414/591; 414/751; 414/225; 414/618
[58] Field of Search ............... 414/589, 591, 592, 618, 414/662, 749–753, 224, 225

[56] References Cited

U.S. PATENT DOCUMENTS

| | | | |
|---|---|---|---|
| 3,051,327 | 8/1962 | Goodell | 414/662 |
| 3,075,651 | 1/1963 | Kaden | 414/618 |
| 3,096,693 | 7/1963 | Simpson | 414/618 X |
| 3,217,901 | 11/1965 | Rise | 414/618 |
| 3,241,380 | 3/1966 | Howing | 414/618 X |
| 3,571,912 | 3/1971 | Kielma | 414/618 X |
| 3,655,070 | 4/1972 | Haydu | 414/618 |
| 3,968,885 | 7/1976 | Hassan | 414/591 |
| 4,032,022 | 6/1977 | Smith | 414/591 X |
| 4,036,374 | 7/1977 | Woltjen | 414/591 |

Primary Examiner—Stephen G. Kunin
Assistant Examiner—Terrance L. Siemens
Attorney, Agent, or Firm—Cushman, Darby & Cushman

[57] ABSTRACT

A general purpose assembly machine of linear indexing type comprising a pallet guide for indexing a plurality of pallets, an elevator block making a rise and fall motion, and a pair of tool plates attached to the elevator block and making a linear and reciprocal motion in a direction parallel to or in a direction making a predetermined angle against an indexing direction of the pallets, wherein a plurality of working heads fixed at the tool plates make a combined horizontal and vertical motion thereby transferring parts from and onto the pallets.

7 Claims, 10 Drawing Figures

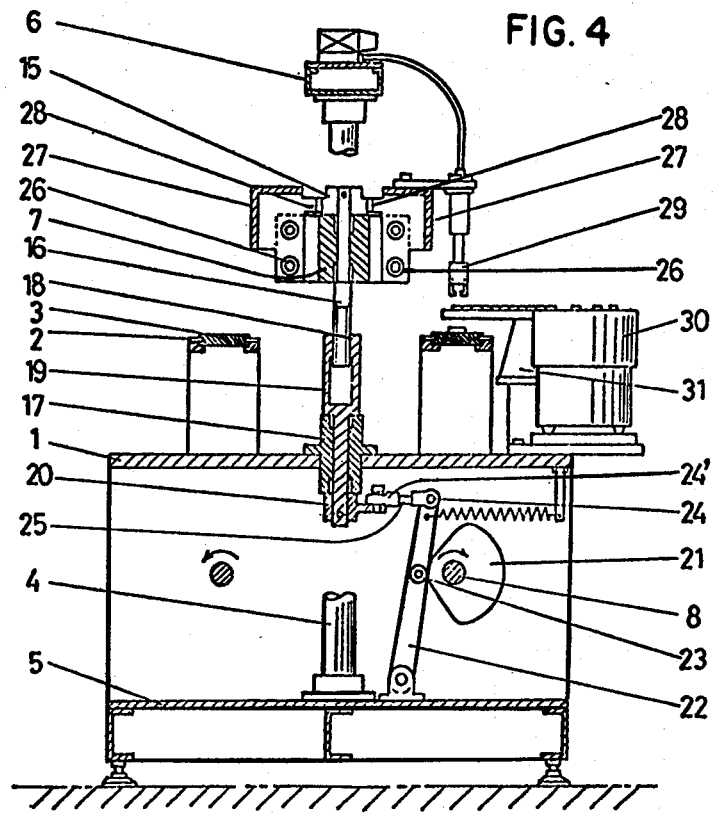

GENERAL PURPOSE ASSEMBLY MACHINE

FIELD OF THE TECHNOLOGY

The present invention relates to an assembly machine by which parts are worked and assembled and where pallets are linearly indexed.

BACKGROUND OF THE INVENTION

A problem inherent in a conventional assembly machine is that operational mechanisms giving an operation to parts are necessary for every assembly station thereby making the assembly machine complex. This fact is reflected in the shortcomings that production costs rise and further that adjustment at a maintenance inspection time is difficult to carry out.

There is also another type of conventional assembly machine where a tool plate is commonly used to provide rise and fall motion (elevator motion) for every assembly station. This type of assembly machine is used only for elevator motion such as for inspection of the existence of the parts on the pallet, and it is not possible to apply it to a transfer operation of the parts.

SUMMARY OF THE INVENTION

The present invention is directed towards a general purpose assembly machine. It is the purpose of the present invention to simplify the construction and adjustment of the assembly machine by combining the operation of rise and fall motion and the linear operation into a combined operation of a tool head. The general purpose assembly machine of the present invention can therefore facilitate not only inspection of the presence of the parts but also feeding and removal of the parts.

BRIEF DESCRIPTION OF THE DRAWINGS

FIG. 4 is a sectional view taken generally along the line B—B in FIG. 2.

FIG. 5 is a diagram showing the relationships between rotation angles of a cam and operations of rise and fall motion and linear motion at several places in the first embodiment of the present invention.

DETAILED DESCRIPTION OF PREFERRED EMBODIMENT

A first embodiment of the general purpose assembly machine of the present invention is now elucidated by referring to FIG. 1–FIG. 5.

Figure 3:
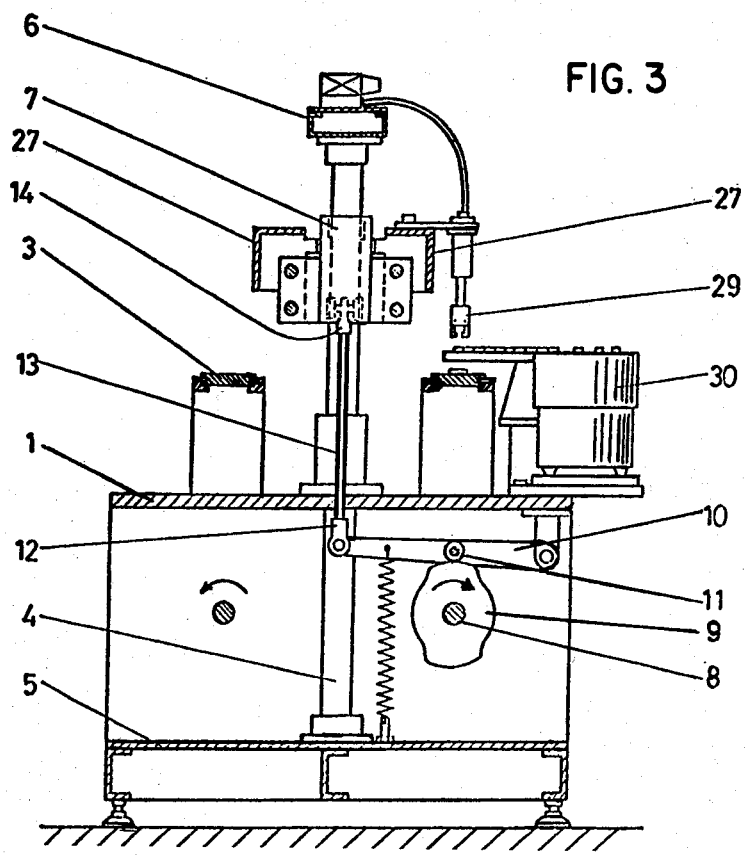
FIG. 3 is a sectional view taken generally along the line A—A in FIG. 2.

A work table 1 has a horizontal and longitudinal pallet guide rails 2 on the upper face thereof. Pallets 3 are indexed in the pallet guide rails 2 by a transfer means (not shown) operated by a suitable mechanism such as a cam mechanism or a fluid pressure cylinder. The pallets 3 are pushed horizontally by the transfer means at four corners of the pallet guide rail 2 so that they are circularly transferred in the pallet guide rails 2. Parts are placed on the pallets 3 and intermittently transferred straight. Pairs of columns 4 are fixed to the work table 1 and a base 5, and the upper end part thereof are fixed to a duct 6. An elevator block 7 is attached to one pair of columns 4 and it slidably moves up and down making use of the pair of columns 4 as a guide means. A cam shaft 8 is disposed in an intermediate place between the work table 1 and the base 5, and a cam 9 is attached thereto as shown in FIG. 3. A lever 10 is provided with a cam follower 11 and is connected with the elevator block 7 by means of a joint 12, a tie-rod 13 and a joint 14. The elevator block 7 makes a rise and fall motion both ways by continuous rotation of the cam 9.

A gear 15 is disposed in the elevator block 7. It is rotatable and rises and falls with the rise and fall of elevator block 7. A vertical shaft 16 is provided through the elevator block 7 and the gear 15. A bracket 17 is fixed to the work table 1. The bracket 17 rotatably holds a pivot 19 having a spline part 18 slidably held at the upper part thereof. A lever 20 is mounted at the lower part of the pivot 19. A cam 21 is fixed at the cam shaft 8. A lever 22 is provided with a cam follower 23 and is connected with the lever 20 by means of a joint 24, a tie-rod 25 and a joint 24'. The lever 22 transmits reciprocating rotating drive force to the pivot 19 which drive force is produced by continuous rotation of the cam 21 and reciprocatively rotates the gear 15 and the vertical shaft 16. Pairs of slide shafts 26 and 26' are disposed parallel to a linear moving direction of the pallets 3 on both sides of the elevator block 7. They are fixed at the elevator block 7. Racks 28 are slidably supported making use of the horizontal slide shafts 26 and 26', respectively, as a guide means. The rack 28 engages with the gear 15 and moves straight both ways parallel to the moving direction of the pallets 3 by the reciprocating rotational drive force. Accordingly, tool plates 27 move reciprocatively in a direction parallel to the moving direction of the pallets 3.

A claw 29, which grips the parts by a driving of fluid pressure is fixed at the tool plate 27 and transfers the works onto the pallets 3. The works are fed in a row by a known bowl type work-feeder 30 and an in-line type work-feeder 31 which are fixed on the work table 1. A detection means 32 which detects whether the parts are well placed on the pallets 3 is also fixed at the tool plate 27. Other operation units which process the parts in several ways can be additionally fixed at the tool plate 27, too.

The general purpose assembly machine of the present invention is constituted as described above. In the general purpose assembly machine, the elevator block 7 makes rise and fall reciprocating motion by means of the cam follower 11, the lever 10 and the tie-rod 13 when the cam 9 rotates. Accompanying this rise and fall motion, the tool plate 27 moves horizontally and reciprocatively in the direction parallel to the moving direction of the pallets 3 by linear reciprocating displacement of the rack 28 caused by rotation of the gear 15.

Figure 1:
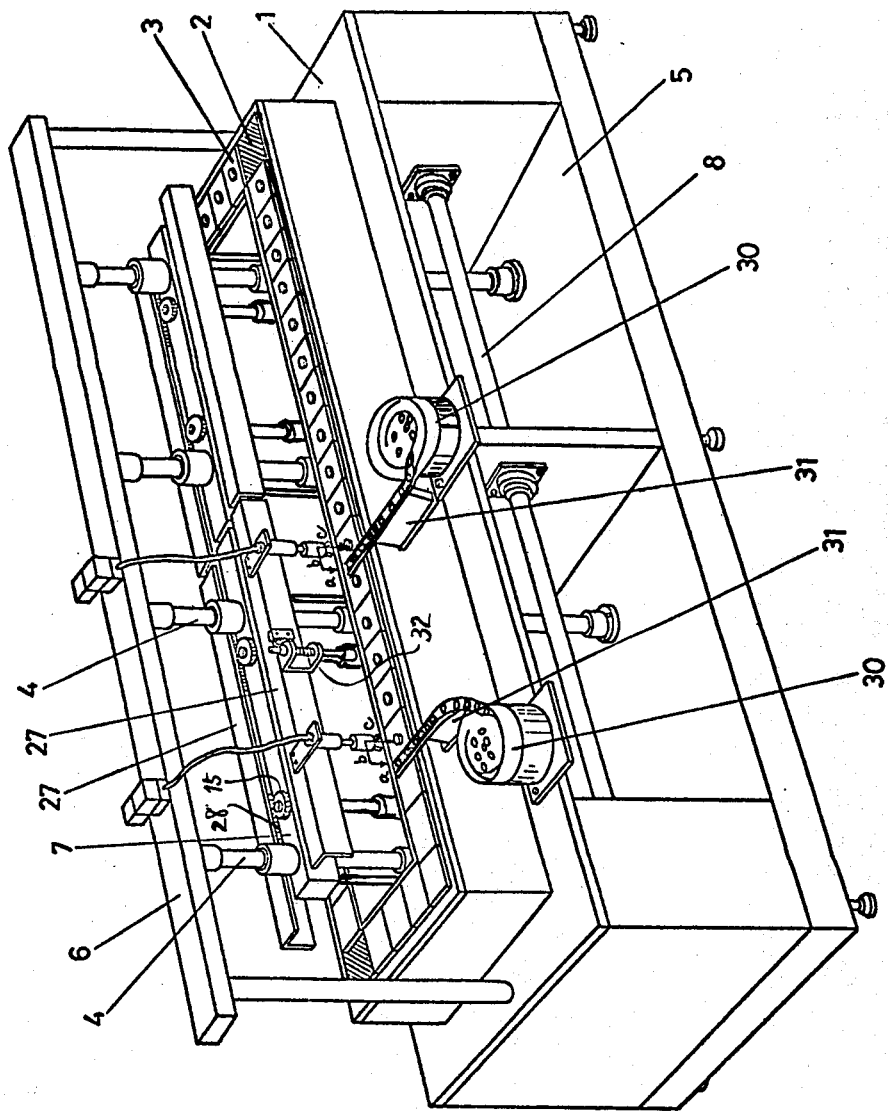
FIG. 1 is a perspective view showing a first embodiment of a general purpose assembly machine in accordance with the present invention.
Figure 2:
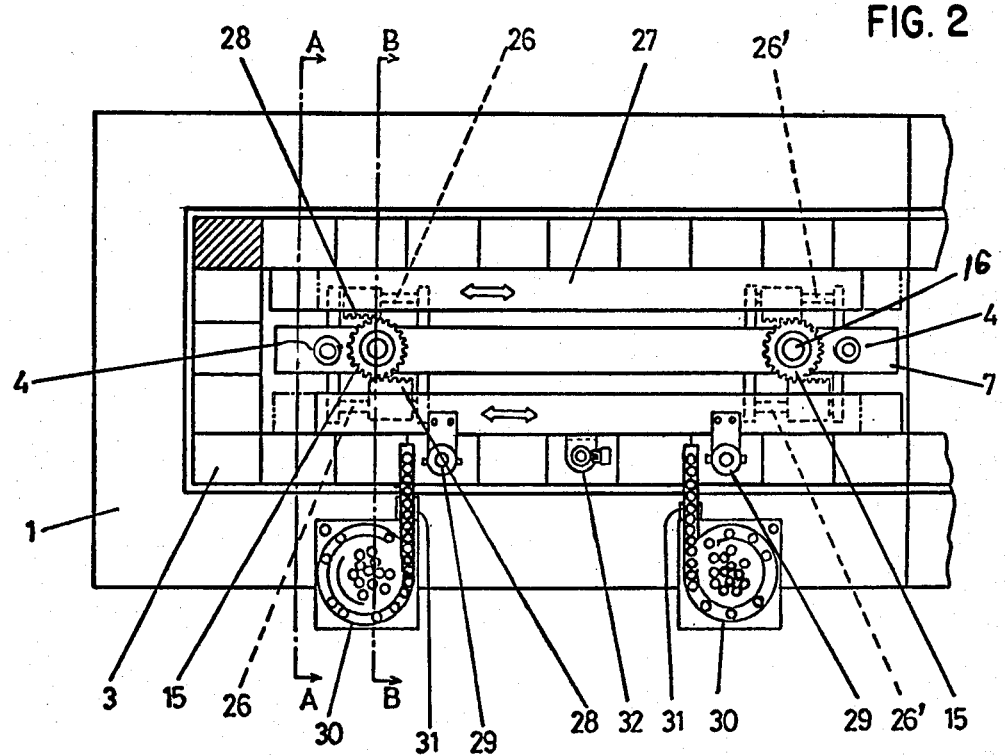
FIG. 2 is a plan view of the left half part of first embodiment shown in FIG. 1 with a duct 6 and related parts removed.

As a result, the tool plate 27 and the claw 29 fall down, stop and rise up at a position "a" shown in FIG. 1. They make a horizontal motion in a direction parallel to the indexing direction of the pallets at a level "b" in FIG. 1 and they fall down at a position "c" in FIG. 1. This combined movement is illustrated in a diagram of FIG. 5, where the degree of the angle designates a rotation angle of the cam 21. The pallets 3 are transferred during the cam angles of 0°–90° and they stop during 90°–360°. The rise and fall motion of the tool plate 27 and the inbetween horizontal movement are also illustrated against the rotation angle of the cam 21. The claw 29 makes the combined movement from the place "a" through "b" then to "c". This movement is reciprocative, and further, repeatedly continued, and the parts are transferred from the in-line feeder 31 onto the pallets 3 one after another.

A second embodiment in accordance with the present invention, a modification of the embodiment of the abovementioned first embodiment, is elucidated in detail referring to FIG. 6–FIG. 9.

A work table 41 has a horizontal and longitudinal pallet guide rail 42 on the upper face thereof. Pallets 43 are indexed in the pallet guide rail 42 by a transfer means (not shown) operated by a suitable mechanism. The pallets 43 are pushed horizontally by the transfer means at four corners of the pallet guide rail 42 so that they are circularly transferred in the pallet guide rail 42. Parts are placed on the pallets 43 and intermittently transferred straight. Pairs of columns 44 are fixed to the work table 41 and a base 45, and the upper end part thereof are fixed to a duct 46. An elevator block 47 is attached to one pair of columns 44 and it slidably moves up and down making use of the pair of columns 44 as a guide means. A cam shaft 48 is disposed in an intermediate place between the work table 41 and the base 45, and a cam 49 is attached thereto. A lever 50 is provided with a cam follower 51 and is connected with the elevator block 47 by means of a joint 52, a tie-rod 53 and a joint 54. The elevator block 47 rises and falls with continuous rotation of the cam 49.

A gear 55 is disposed in the elevator block 47. It is rotatable and rises and falls together with the elevator block 47. A vertical shaft 56 is provided through the elevator block 47 and the gear 55. A bracket 57 is fixed to the work table 41. The bracket 57 rotatably holds a pivot 59 having a spline part 58 slidably held at the upper part thereof. A lever 60 is mounted at the lower part of the pivot 59. A cam 61 is fixed at the cam shaft 48. A lever 62 is provided with a cam follower 63 and is connected with the lever 60 by means of a joint 64, a tie-rod 65 and a joint 64'. The lever 62 transmits reciprocating rotating drive force to the pivot 59 which drive force is produced by continuous rotation of the cam 61 and reciprocatively rotates the gear 55 and the vertical shaft 56. Pairs of tool plates 66 are disposed parallel to the pallet guide rail 42 on both sides of the elevator block 47. Through-holes 67 are provided in the elevator block 47. A pair of racks 68 engages with the gear 55 on both sides thereof. One end of the rack 68 is fixed to the tool plate 66 and the other end is slidably supported to move in the throughhole 67.

A claw 69 which grabs the parts by fluid pressure is fixed at the tool plate 66 and transfers the parts onto the pallets 43. The parts are fed in a row by a known bowl type work-feeder 70 and an in-line type work-feeder 71 which are fixed on the work table 41. A detection means 72 which is, for example, a photoelectric detection apparatus for detecting whether the parts are well placed on the pallets 43 is also fixed at the tool plate 66. Other operation units which process the parts in several ways can be additionally fixed at the tool plate 66, too.

The constitution of the second embodiment of the general purpose assembly machine in accordance with the present invention described. Its operation is described below.

The elevator block 47 rises and falls by means of the cam follower 51, the lever 50 and the tie-rod 53 when the cam 49 rotates. Accompanying this rise and fall motion, the tool plate 66 moves reciprocatively and horizontally in a direction perpendicular to the moving direction of the pallets 43, by means of the reciprocating displacement of the rack 68 caused by the reciprocating rotation of the gear 55.

Figure 6:
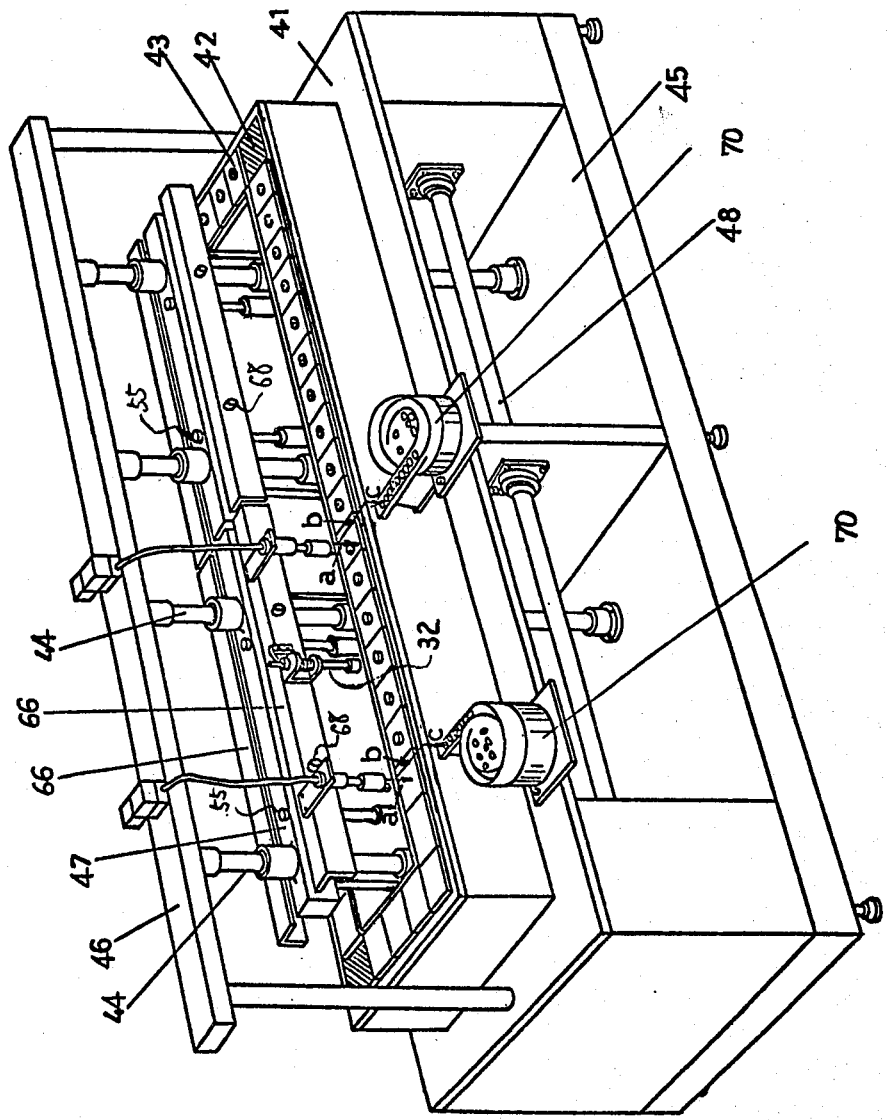
FIG. 6 is a perspective view showing a second (modified) embodiment of a general purpose assembly machine in accordance with the present invention.
Figure 7:
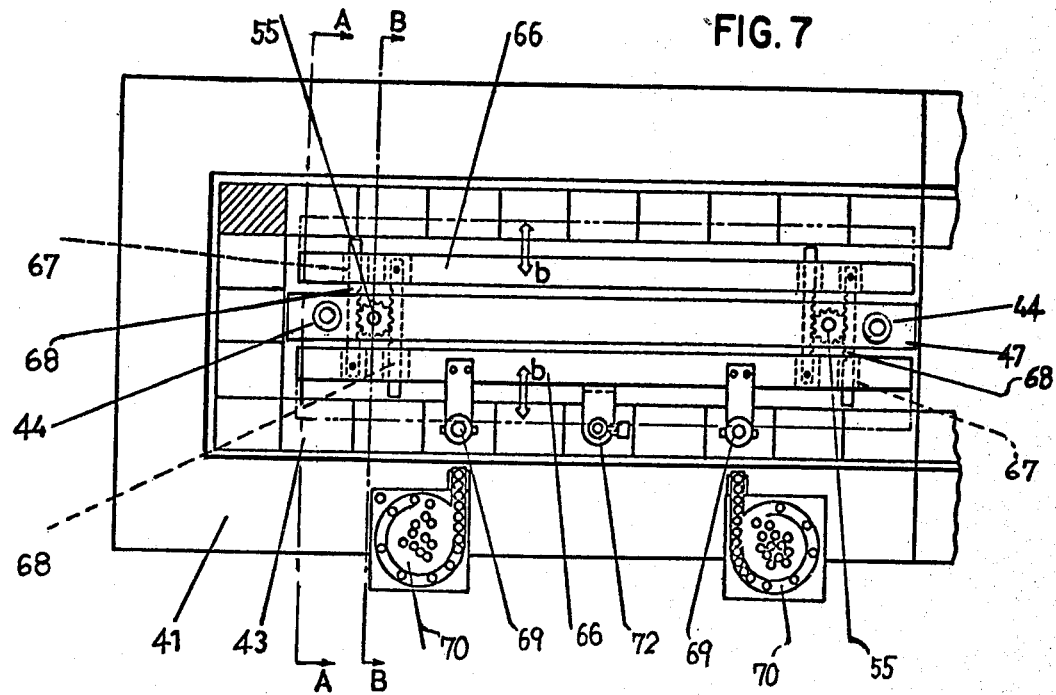
FIG. 7 is a plan view of the left half part of the second embodiment shown in FIG. 6 with a duct 46 and related parts removed.
Figure 8:
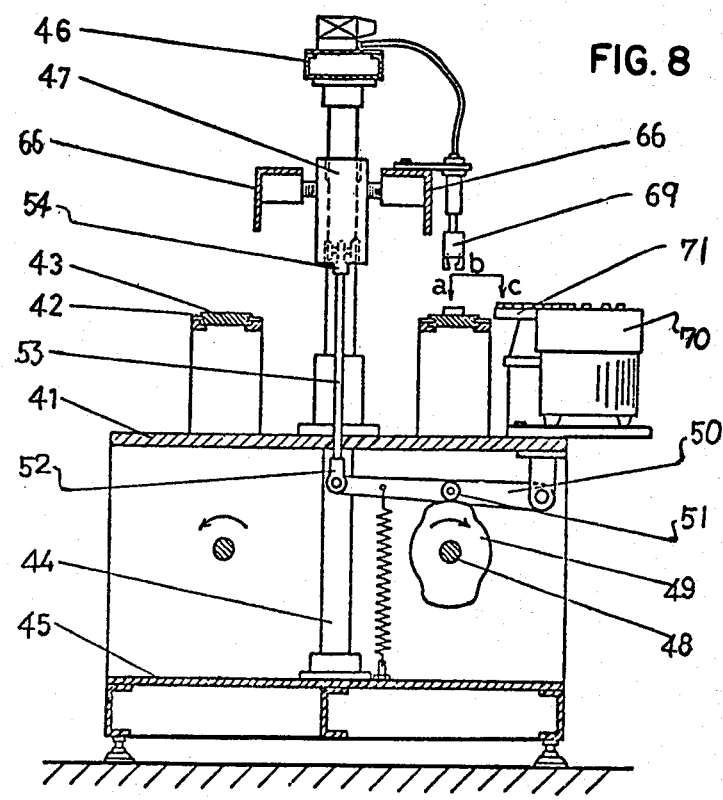
FIG. 8 is a sectional view taken generally along the line A—A in FIG. 7.
Figure 9:
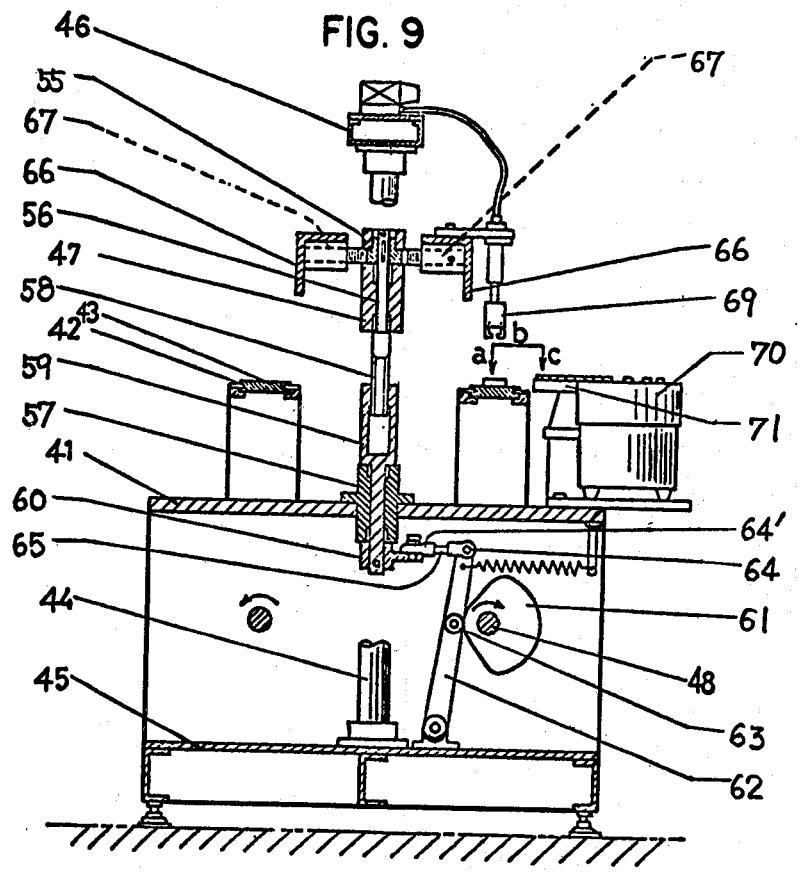
FIG. 9 is a sectional view taken generally along the line B—B in FIG. 7.

As a result, the tool plate 66 and the claw 69 fall down, stop and rise up at a position "a" shown in FIG. 6. They make a horizontal motion at a level "b" in FIG. 6 and they fall down at a position "c" in FIG. 6. This combined movement is carried out in a similar way for the first embodiment. The chuck 69 makes the combined movement from the place "a" through "b" then to "c". This movement is reciprocative, and further, repeatedly continued, and the parts are transferred from the in-line feeder 70 onto the pallets 43 one after another.

Figure 10:
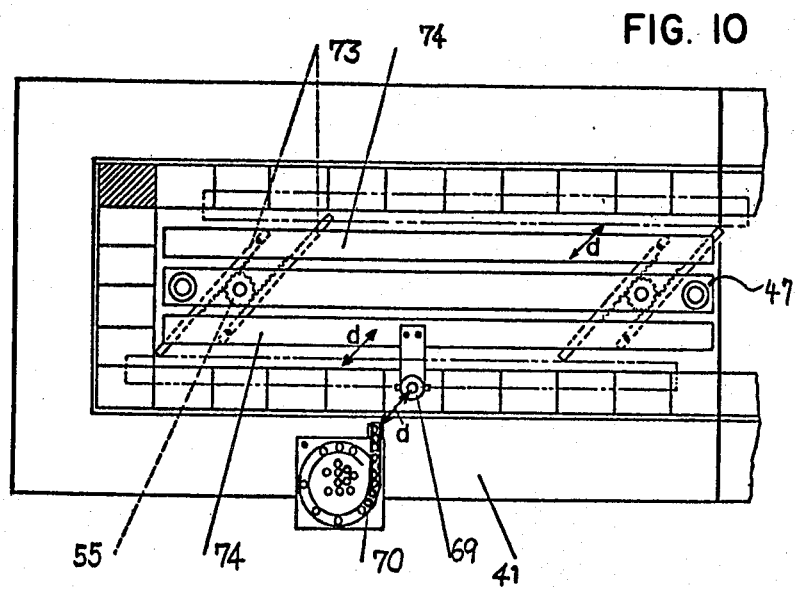
FIG. 10 is a plan view showing still another modified embodiment.

FIG. 10 shows still another modified embodiment. Racks 73 are provided parallel to each other and horizontally on both sides of a gear 55. A pair of tool plates 74 is disposed on both sides of a rise and fall block 47 parallel to a moving direction of pallets. The racks 73 are disposed to make a specified angle (not rectangular one) against the tool plates 74. Opposite ends of the racks 73 are respectively fixed to the opposite side tool plate 74. In this third embodiment of the present invention, the tool plate 74 makes rise and fall motion perpendicular to the face of the pallets. Accompanying this rise and fall motion, the claw 69 fixed at the tool plate 74 moves reciprocatively making the specified angle (not a rectangular one) against the moving direction of the pallets by horizontal displacement of the rack 73 caused by rotation of the gear 55. By the oblique movement, which is a combination of lengthwise and widthwise motion, of the chuck 69 (shown by arrows "d" in FIG. 10), parts are transferred in the oblique movement onto the pallets from an in-line feeder 70. In this case, inspection of the parts to be placed onto the pallets can be easily made from the front side of the general purpose assembly machine. This is one advantageous point of the third embodiment, since adjustment and maintenance of the assembly machine are easy to carry out.

In summary, the present invention can provide a general purpose assembly machine comprising the tool plate common to several heads consisting of the chuck, the detection means and other operation units thereby giving rise to the following merits. The structure of the conventional operation units can be simplified resulting in a compact structure of the assembly machine. It is not necessary to provide an operation unit for a horizontal motion or a vertical motion for each one of the heads. Therefore, adjustment and maintenance of the assembly machine becomes easier.

This is quite advantageous when several number of heads (chuck, detection means, etc.) are used. Furthermore, the number of parts constructing the assembly machine becomes smaller and weight of the machine diminishes.

What is claimed is:

1. A general purpose assembly machine comprising a pallet guide formed in a closed planar loop having at least two spaced longitudinally directed straight parallel portions for indexing said plurality of pallets;
    a pair of vertical columns situated within said closed loop of said pallet guide;
    an elevator block slidably mounted for vertical movement to said pair of vertical columns;
    two parallel longitudinally elongated tool plates attached to said elevator block on opposite sides thereof reciprocable with predetermined strokes with respect to said elevator block in a plane parallel to the plane of said closed loop;
    means for reciprocally moving said elevator block and said two tool plates together vertically in synchronous relation to said predetermined strokes; and
    a plurality of means, mounted to said two tool plates at longitudinally spaced apart locations, for handling parts disposed on said pallets.

2. A general purpose assembly machine according to claim 1, wherein said plurality of handling means comprise a plurality of gripping means and inspection means.

3. A general purpose assembly machine comprising:
    a pallet guide formed in a plane closed loop having at least two spaced longitudinally directed straight parallel portions for indexing a plurality of pallets;
    a pair of vertical columns situated within said closed loop of said pallet guide;
    an elevator block slidably mounted for vertical movement to said pair of vertical columns;
    a pair of parallel, longitudinally elongated tool plates attached to said elevator block on opposite sides thereof;
    two longitudinally aligned reciprocally rotatable gear means, longitudinally fixed with respect to said elevator block and disposed between said two tool plates, for reciprocally moving said two tool plates with predetermined strokes in opposite directions in a plane parallel to the plane of said loop in response to the reciprocal rotation of said gear means;
    means for reciprocally moving said elevator block and said two tool plates together vertically in synchronous relation to said predetermined strokes; and
    a plurality of means, mounted to said two tool plates at longitudinally spaced apart locations, for handling parts disposed on said pallets.

4. A general purpose assembly machine according to claim 3 wherein said elevator block moving means comprises cam means, including
    a cam shaft having first and second cams respectively mechanically linked to said elevator block and said gear means for synchronously reciprocally moving said elevator block and said gear means.

5. A general purpose assembly machine in accordance with claim 3, wherein said plurality of handling means comprise a plurality of gripping means and inspection means.

6. A general purpose assembly machine according to claim 2 or claim 1 or claim 3, wherein said predetermined stroke is in a direction transverse to the longitudinal direction of said pallet guide.

7. A general purpose assembly machine according to claim 2 or claim 1 or claim 3, wherein said predetermined stroke is in a direction at an oblique angle to the longitudinal direction of said pallet guide.

* * * * *